April 21, 1942.  W. B. STODDARD, JR  2,280,168
PROCESS OF PREPARING CUPROUS OXIDE
Filed Aug. 22, 1941
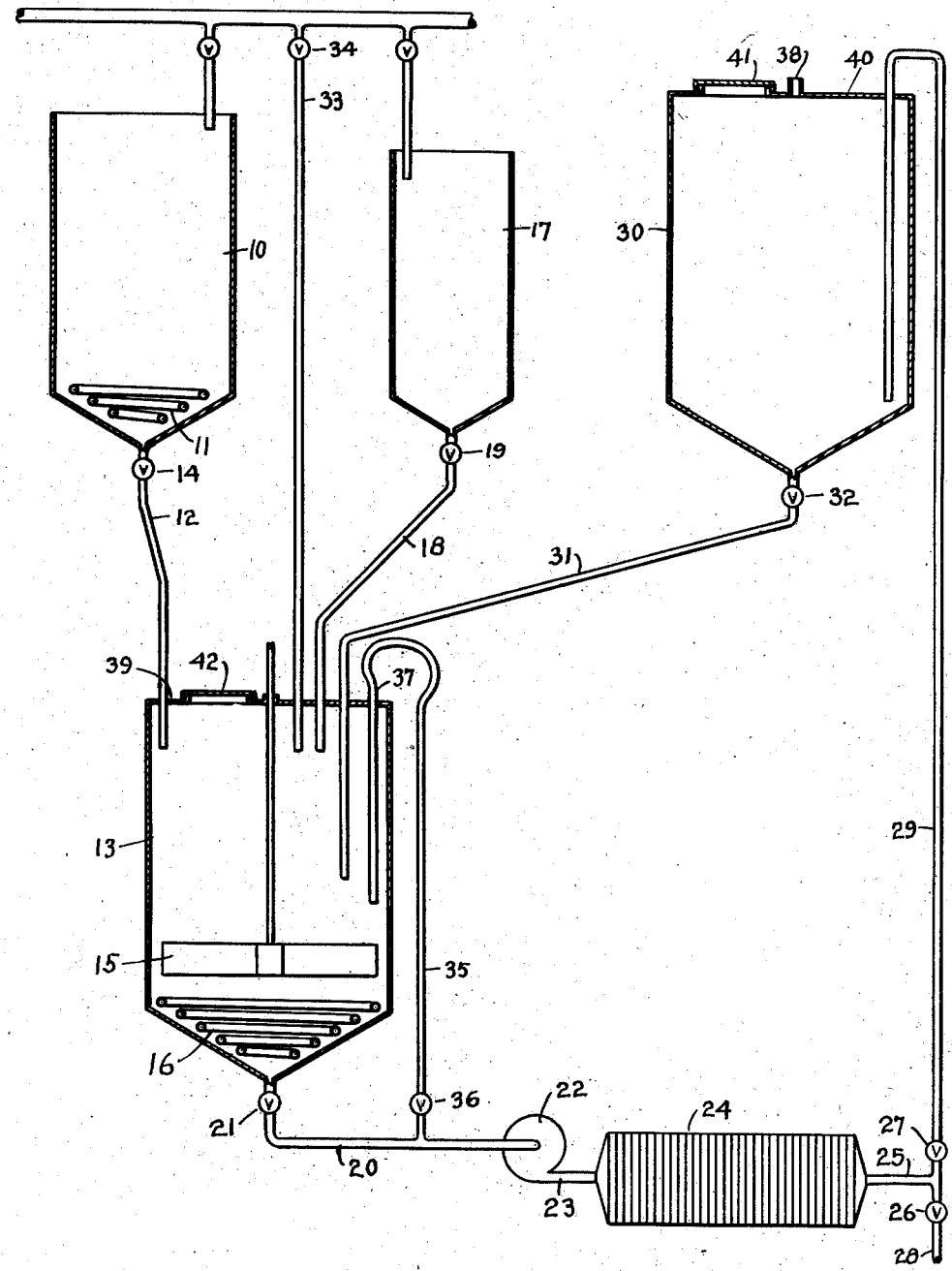
INVENTOR
William B. Stoddard Jr.
BY
J. Edward Knapp
ATTORNEY Patented Apr. 21, 1942

2,280,168

UNITED STATES PATENT OFFICE 2,280,168

PROCESS OF PREPARING CUPROUS OXIDE

William B. Stoddard, Jr., Hamilton, Ohio

Application August 22, 1941, Serial No. 407,975

10 Claims. (Cl. 23—147)

This invention relates to a process of preparing cuprous oxide.

Cuprous oxide is useful in the manufacture of anti-fouling marine paints, in the preparation of copper plating baths, and for other purposes.

One object of the present invention is to provide a simple, relatively inexpensive, easily controlled process of preparing cuprous oxide. Another object is to provide a cyclic process for the preparation of this material whereby certain of the original chemicals used may be repeatedly employed in the preparation of additional quantities of cuprous oxide. Other objects will become apparent in the course of the following description.

In carrying out the invention according to the preferred procedure, a copper salt, advantageously copper sulphate, is allowed to react with a solution of sodium sulphite or other alkali metal sulphite. The quantities of these two chemicals are so chosen that the precipitate which first forms upon bringing these materials together redissolves. This requires an excess of the sulphite. It is my opinion that a complex salt results which appears to have the composition:

$$Cu_2SO_3.4Na_2SO_3$$

This material is soluble in water. I prefer to use the proportions of copper sulphate and sodium sulphite indicated in the following equation:

$$2CuSO_4 + 9Na_2SO_3 + H_2O \rightarrow$$
$$(Cu_2SO_3.4Na_2SO_3) + Na_2SO_3 + 2NaHSO_3 + 3Na_2SO_4$$

More or less sodium sulphite may be used for any given quantity of copper sulphate, but I have observed that when using less than 8 moles of sodium sulphite for each 2 moles of copper sulphate, there is ordinarily produced a turbid and dark colored solution; and with more than 9 moles of sodium sulphite there appears to be excessive atmospheric oxidation of the sodium sulphite, which is wasteful.

After the above mentioned reaction has taken place and the solution has become clear and light colored, an alkaline compound of an alkali metal is added, advantageously caustic soda, the amount of alkali being in accordance with the following equation:

$$Cu_2SO_3.4Na_2SO_3 + Na_2SO_3 + 2NaHSO_3 + 4NaOH \rightarrow$$
$$Cu_2O + 8Na_2SO_3 + 3H_2O$$

The addition of the alkali produces a precipitation. Ordinarily this precipitate is yellow in color and very finely divided. The precipitate is allowed to settle and the clear supernatant liquid is removed by decantation or otherwise. The precipitate is now washed with fresh water and it may be boiled for a short time. If desired, this washing process may be repeated. Ordinarily this treatment will cause the precipitate to take on a reddish color and the rate of settling is more rapid. The precipitate is now removed from the wash water, as by filtration, and may be dried in any desired manner. Depending upon the thoroughness of the washing process, the precipitate will have a copper content of from 80% to 85% or more, and consists largely of cuprous oxide ($Cu_2O$). It may be more or less hydrated. It has sometimes been noted that the precipitate may carry with it a small amount of some sulphite, but for most purposes this is not objectionable.

The liquor from which the precipitated cuprous oxide was decanted consists for the most part of a solution of sodium sulphite. In addition it contains a small amount of sodium sulphate. It may be used for the treatment of a fresh batch of copper sulphate in repeating the process, advantageously after fortifying with a small amount of sodium sulphite.

From what has been stated it will be apparent that the chemicals used in the process comprise:

| | Moles |
|---|---|
| $CuSO_4$ | 2 |
| $Na_2SO_3$ | 9 |
| $H_2O$ | 1 |
| $NaOH$ | 4 |

The products of the process comprise:

| | Moles |
|---|---|
| $Cu_2O$ | 1 |
| $Na_2SO_4$ | 3 |
| $Na_2SO_3$ | 8 |
| $H_2O$ | 3 |

Thus it can be seen that whereas the original sodium sulphite solution contained 9 moles $Na_2SO_3$ for every 2 moles of copper sulphate, only one mole of $Na_2SO_3$ has disappeared in the process. It is therefore necessary theoretically to add only one mole of $Na_2SO_3$ to the liquors before re-using.

This procedure may be repeated a number of times before the accumulation of by-products such as $Na_2SO_4$ becomes serious enough to interfere.

Due to the susceptibility of the sulphite to oxidation, it is desirable to carry out the reactions, and particularly the precipitation step, in an enclosed vessel protected from the air.

The invention will be more particularly described by reference to the accompanying drawing which is a diagrammatic representation of one form of apparatus for carrying out the invention. In the drawing, 10 represents a tank for dissolving the copper sulphate. This tank may be provided with a steam coil 11 for heating the contents. The tank is provided with a bottom outlet connecting with the pipe 12 which discharges into mixing tank 13. The pipe 12 is provided with a suitable valve 14. Tank 10 is also provided with a usual means of calibration whereby the contents may be accurately measured. Tank 13 is equipped with an agitator 15 and a steam coil 16 for heating the contents. Tank 13 is advantageously provided with a cover 39 to prevent or reduce atmospheric oxidation of the materials. Cover 39 is provided with a manhole having a cover 42 for charging solid sodium sulphite into tank 13. Tank 17 is provided for dissolving the caustic soda. It is connected to tank 13 by means of pipe 18 through a bottom outlet. This pipe is also provided with a valve 19. Tank 13 is connected by a bottom outlet to pipe 20 in which is located valve 21. Pipe 20 is connected to a pump 22. The discharge side of the pump is connected by pipe 23 to a filter press 24 which may be of the conventional type. The filtrate from the filter press may be delivered through pipe 28 to the sewer or through pipe 29 to a storage tank 30 by appropriate manipulation of valves 26 and 27. Tank 30 has a bottom outlet to which is connected pipe 31 in which is located valve 32. Tank 30 is also advantageously provided with a close fitting cover 40 to prevent or reduce access of air to the chemicals. Cover 40 is provided with a manhole having a cover 41 for charging solid sodium sulphite into tank 30. Pipe 31 connects storage tank 30 with mixing tank 13. A pipe 33 containing valve 34 is adapted to deliver water to tank 13. Tank 13 is also connected to the pump 22 by means of a pipe 35 containing valve 36. This pipe 35 does not extend clear to the bottom of tank 13 but is advantageously connected to a hose 37 which may be adjusted to different heights and is adapted to draw off liquid from above the level of the precipitate in tank 13.

The following example is given to more particularly illustrate the process as carried out in the above described apparatus. Dissolve 185 pounds of copper sulphate ($CuSO_4.5H_2O$) in 92 gallons of water in tank 10. During this operation the solution is heated to 180° F., after which the solution is allowed to cool somewhat. Eight hundred and sixty pounds of sodium sulphite ($Na_2SO_3.7H_2O$) is charged into tank 13 through manhole 42 and is dissolved in 80 gallons of water in tank 13. The solution is heated to 110° F. using the agitator 15 to hasten the solution of the chemical. Valve 14 in pipe 12 is then opened and a stream of copper sulphate solution at 110° F. is slowly introduced into tank 13, the agitator 15 meantime continuously stirring the liquid. A precipitate first forms but this substantially completely redissolves in the liquid. In order to remove all traces of precipitated material which may be due to impurities present, valve 21 in pipe 20 is opened and the contents of tank 13 are forced through the filter 24 by operation of the pump 22. The filtrate from the filter passes through pipes 25 and 29. During this operation valve 27 is open and valve 26 is closed. By this means the filtrate containing what is believed to be a complex sodium sulphite-copper sulphite solution is transferred to tank 30, the air in tank 30 being displaced through vent 38. Mixing tank 13 is then rinsed with a small amount of water through pipe 33, which water then passes through the pump 22 and filter 24 through pipes 25 and 29 and is added to the contents of tank 30. Filter 24 is then cleaned. Valve 32 is opened allowing the solution in tank 30 to flow through pipe 31 back into tank 13.

Sixty and one-half pounds of sodium hydroxide is dissolved in 12 gallons of water in tank 17. Valve 19 is then opened allowing the sodium hydroxide to flow through pipe 18 into tank 13. During this operation the agitator 15 is in continuous operation. The agitator is now stopped and the solution allowed to stand over night in order that the precipitate might settle.

The supernatant liquid lying above the precipitate is then carefully drawn off through hose 37, pipe 35, pump 22, filter 24 and pumped to storage tank 30. Water is introduced into tank 13 through pipe 33, the agitator put into motion, and steam introduced into the steam coil 16. The mixture is heated to a boiling temperature and boiled for 15 minutes. The agitator is then stopped and the precipitate allowed to settle for about an hour. The supernatant wash water is next pumped through hose 37, pipe 35, and filter 24 and discharged into sewer through pipe 28. The precipitate is again washed with fresh water and the wash water removed as just described. Finally fresh water is introduced into tank 13, the agitator put into motion, valve 21 is opened, and the suspension passed through pipe 20, pump 22, pipe 23, and is filtered in filter 24, the filtrate passing to the sewer through pipe 28. The precipitate is then removed from the filter and dried in shallow boxes. The dried material consists of a fine reddish powder of relatively pure cuprous oxide, somewhat hydrated, which upon analysis contains about 83% Cu.

The supernatant liquid withdrawn from the precipitate before the washing step and which is held in tank 30, is now analyzed and ordinarily will require about 125 pounds of sodium sulphite, which is next added thereto through manhole 41. Valve 32 is opened and the solution allowed to flow into tank 13 and a fresh charge of copper sulphate solution is allowed to flow into tank 13 and the process repeated.

Although the invention has been described with particular reference to the use of copper sulphate, sodium sulphite, and sodium hydroxide, it is not limited to these particular compounds, as other copper salts, sulphites, and alkalies such as sodium carbonate, may be used, as will be apparent to those skilled in the art. I have also found that alkali metal thiosulphates may be substituted for sulphites in the process.

In place of filtering out the cuprous oxide, a continuous centrifuge may be used and the whole process may be carried out substantially continuously.

I claim:

1. Process of preparing cuprous oxide which comprises bringing together in aqueous medium a copper compound and a compound of the class comprising alkali metal sulphite and alkali metal thiosulphate, thereafter adding an alkaline compound of an alkali metal, and separating the resulting precipitate from the liquor.

2. Process of preparing cuprous oxide which comprises mixing in water solution a cupric salt with sodium sulphite, to the resulting mixture adding sodium hydroxide, and separating the precipitate containing cuprous oxide.

3. Process of preparing cuprous oxide which comprises reacting in aqueous medium a soluble copper compound and an alkali metal sulphite to form a solution comprising a complex compound of cuprous sulphite and alkali metal sulphite, adding caustic alkali, and removing from the liquor the resulting precipitate comprising cuprous oxide.

4. Process of preparing cuprous oxide which comprises mixing aqueous solutions of copper sulphate and sodium sulphite in about the proportion of 2 moles copper sulphate and 9 moles sodium sulphite, thereafter adding sodium hydroxide in the proportion of about 4 moles sodium hydroxide, and filtering off the precipitate comprising cuprous oxide.

5. Process of preparing cuprous oxide which comprises adding a solution of an alkali sulphite to a solution of a copper salt with agitation until the precipitate which forms redissolves, and adding alkali metal hydroxide to precipitate cuprous oxide.

6. In a cyclic process for the preparation of cuprous oxide the steps which comprise mixing a solution of a copper compound with an excess of a solution of a compound of the class comprising alkali metal sulphite and alkali metal thiosulphate, adding an alkaline compound of alkali metal to precipitate cuprous oxide, separating the cuprous oxide from the liquor and using said liquor in the treatment of a fresh supply of copper compound.

7. In a cyclic process for the preparation of cuprous oxide the steps which comprise adding a water solution of a copper compound to a water solution of an alkali metal sulphite in such proportions that the precipitate which forms is substantially completely redissolved, adding alkali metal hydroxide to the resulting solution to precipitate cuprous oxide, separating the cuprous oxide from the liquor, and using said liquor in the treatment of a fresh batch of copper compound.

8. In a cyclic process for the preparation of cuprous oxide the steps which comprise adding a solution of copper sulphate to an excess of a solution of sodium sulphite, filtering off any insoluble material, adding a solution of sodium hydroxide to precipitate cuprous oxide, filtering off the cuprous oxide and re-using the filtrate containing sodium sulphite and sodium sulphate for further treatment with a fresh supply of copper sulphate solution.

9. In a cyclic process the steps which comprise mixing together under conditions of agitation a solution of copper sulphate and sodium sulphite to form a water soluble complex comprising cuprous sulphite and sodium sulphite, filtering off any insoluble matter, adding sodium hydroxide to precipitate cuprous oxide, allowing the precipitate to settle, removing the supernatant liquid containing sodium sulphite, washing the precipitate with water, boiling the precipitate with water, separating the precipitate from the wash water and drying the precipitate, replenishing the aforesaid supernatant liquid with sodium sulphite to bring the sodium sulphite content up to about the content of the original sodium sulphite solution, adding a fresh supply of copper sulphate to said replenished liquor, and repeating the process.

10. A cyclic process for the preparation of cuprous oxide which comprises mixing solutions of a cupric salt and alkali metal sulphite in the proportions of from three to five moles of sulphite for each mole of cupric salt, adding alkali metal hydroxide to precipitate cuprous hydroxide, separating the precipitate from the liquor, replenishing the liquor with alkali metal sulphite to about its original content of alkali metal sulphite, and repeating the process with a fresh charge of cupric salt.

WILLIAM B. STODDARD, Jr.